United States Patent [19]

Larssen

[11] 4,193,162
[45] Mar. 18, 1980

[54] FLEXIBLE BUSHINGS

[75] Inventor: Steinar Larssen, Helldal, Norway

[73] Assignee: Patents and Developments A/S, Helldal, Norway

[21] Appl. No.: 843,885

[22] Filed: Oct. 20, 1977

[51] Int. Cl.$^2$ ............................................. F16L 5/00
[52] U.S. Cl. ............................................. 16/2; 285/200
[58] Field of Search .................. 16/2; 285/158, 159, 285/161, 192, 200, 205, 349; 277/26

[56] References Cited

U.S. PATENT DOCUMENTS 2,793,057  5/1957  McGugin ............................. 285/349

FOREIGN PATENT DOCUMENTS 720741  12/1931  France ................................. 285/158
1375647  11/1974  United Kingdom ................... 277/26

*Primary Examiner*—Werner H. Schroeder
*Assistant Examiner*—Doris L. Troutman
*Attorney, Agent, or Firm*—Kenyon & Kenyon

[57] ABSTRACT

Flexible bushing for supporting a pipe conduit on each side of a wall having an opening for receiving the bushing. The bushing includes an inner component forming a pipe portion adapted for mounting the pipe conduits coaxially thereof, an outer fastening component secured in gas-tight fashion to the wall at the opening and an annular rubber element forming a gas-tight connection between the inner and outer components. Annular protective flanges are associated with either the inner or outer component and under normal temperature conditions define an open slot between the inner and outer components and the annular rubber element. A barrier creator borders the slot and is adapted to be activated by the action of heat to close off the slot in a flame-protecting and, preferably, gas-tight manner.

17 Claims, 8 Drawing Figures

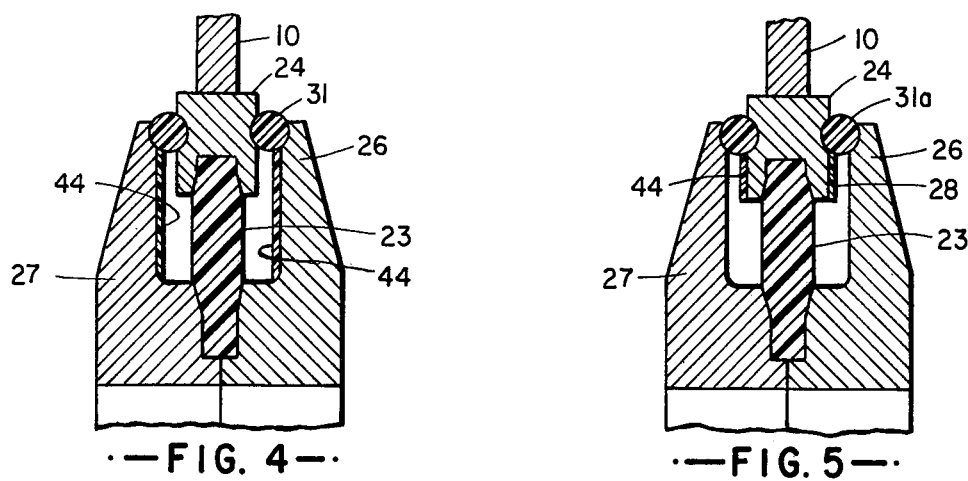
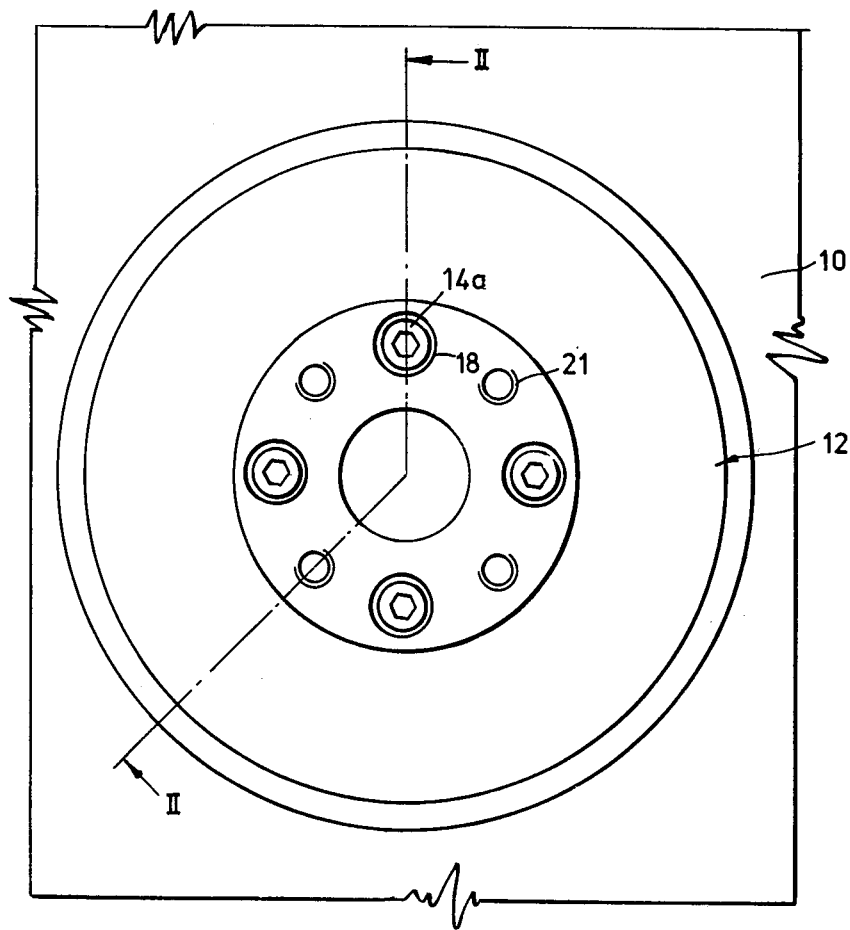

U.S. Patent  Mar. 18, 1980  Sheet 2 of 2  4,193,162
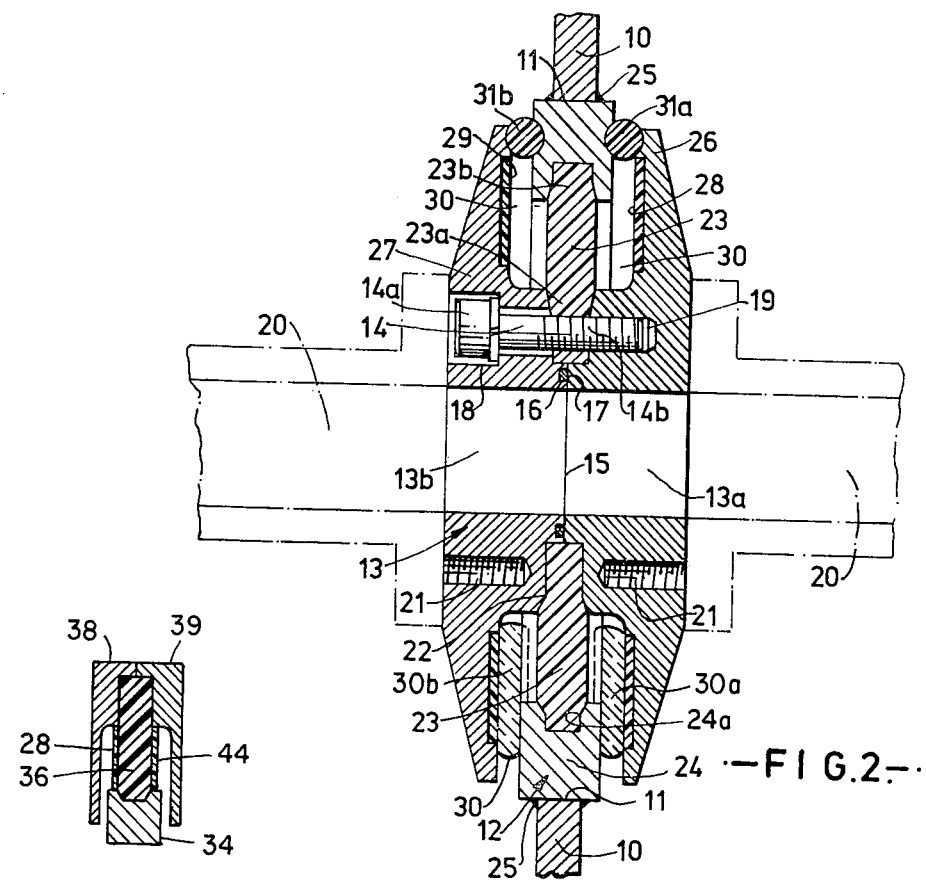
—FIG. 2—
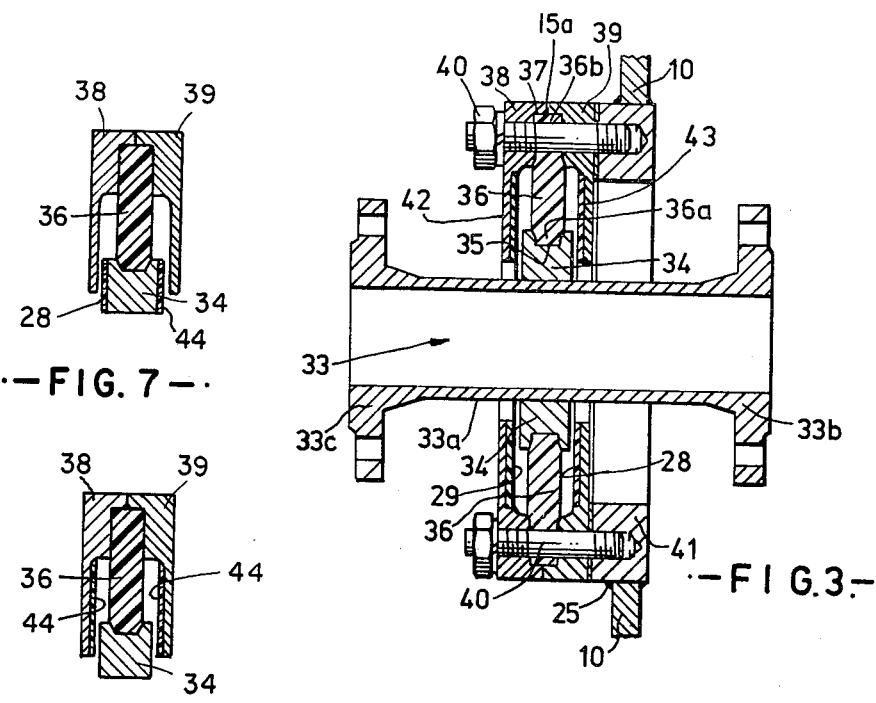
—FIG. 6—
—FIG. 7—
—FIG. 3—
—FIG. 8—

FLEXIBLE BUSHINGS

This invention relates to a flexible bushing for supporting a pipe conduit on each side of a space-dividing structure defining an opening for reception of said bushing therein.

With the present invention, the aim is to provide a flexible pipe bushing which especially, but not exclusively, finds application on board ship. On board ship, one runs the risk of high noise levels due to vibrations, for example, from pipe conduits, being transferred to such space-dividing structures as, for example, bulkheads and decks. Especially, embarrassing noise problems and vibration problems can, for example, emanate from high pressure hydraulic pipe conduits. In order to prevent the transmission of vibrations from a pipe conduit to a space-dividing structure in a pipe bushing, it is necessary to obtain a flexible connection between this structure and the pipe conduit. In order to prevent the leakage of flue gas or other gas via the pipe bushing, during normal conditions as well as during the occurrence of heat generation or the start of a fire, and from the one side to the other side of the space-dividing structure, it is necessary to have a gas-tight connection. However, in order to prevent a flexible gas-tight connection from producing gas on heat generation or from being destroyed on the generation of heat or the start of a fire, one has had, hitherto, to reduce the demands for vibration dampening and/or demands for gas sealing.

It has hitherto been usual to utilise different forms of vibration-dampening rubberised intermediate flanges. Such solutions dampen the vibrations in the pipe conduit in a manner scarcely satisfactory and are not especially resistant to the action of flame either since the rubber in the rubberised intermediate flanges has the opportunity, with strong heat, of being carbonised or partially burnt up.

With the present invention, the particular objective is a solution which can ensure a high degree of vibration dampening and gas sealing on normal use, that is to say at normal temperatures and which, on the generation of heat or the start of a fire, can ensure, nevertheless, a gas-tight sealing of the pipe bushing.

Accordingly, the present invention resides in a flexible bushing for supporting a pipe conduit on each side of a space-dividing structure defining an opening for reception of said bushing therein. The bushing comprises inner means forming a pipe portion adapted for mounting the pipe conduits coaxially thereof, outer fastening means secured in a gas-tight fashion to the space dividing structure at the opening and an elastically yielding annular element forming a gas-tight connection between the pipe portion-forming inner means and the outer fastening means. In addition, protective annular flanges are associated with one of the pipe portion-forming inner means and said outer fastening means and under normal temperature conditions define an open slot with the remaining means and the annular element. Also, barrier-forming means border the slot and are adapted to be activated by the action of heat to close off the slot in at least a flame-protecting manner.

The present invention makes it possible to use simple means to provide an especially elastically yielding and, at the same time, gas-tight connection between the inner and outer components, the slot which is formed between the protective flanges and the annular element permitting vibration dampening of the inner component without producing metallic contact between the mutually moveable portions of the pipe bushing. By means of the barrier-forming means which is adapted to close off the slot in a flame-protecting and, preferably, gas-tight manner with the appearance of heat, there is the opportunity of obtaining an effective flame protection for the annular element. In this way, one can counteract to a significant degree the carbonisation or burning up of the annular element. Even if the annular element should be destroyed as a consequence of the heat, the barrier-forming means can prevent or, at any rate, strongly reduce the danger of gas leakage through the pipe bushing.

As a barrier-forming means, there can be utilised, for example, spring-loaded stop devices where the force of the spring which brings about the stopping or blocking of the slot can be released on the generation of heat which, for example, melts the device. Such stop devices can be formed by the aforesaid protective flanges or can constitute parts of these.

In a preferred embodiment, the barrier-forming means consists of a heat-expanding material in the form of a disc or a coating fixed to a protective flange and/or to adjacent parts of the pipe bushing i.e. on side surfaces of the rings facing the protective flanges.

A disc-shaped, heat-expanding material can, for example, consist of 2 mm thick panel of the "Palusol" type supplied by the firm BASF, Western Germany, and based on hydrated sodium silicate having a content of about 30 weight percent water and covered with a glass fibre coating of 0.1 mm thickness. Under the influence of heat at 100°–200° C., the material rises up to a thickness of about 15 mm. The material corresponds to the claims according to DIN 4102.

There can be utilised a coating-forming heat expanding material, such as a water-based fire-preventing coating such as "Flame-Mastic," a fire-preventing paint, such as "Pyromors" (DIN 4102) or "Pyrotect S 30" (DIN 4102) or a fire-preventing lacquer, such as "Albi-P8" (DIN 4102) supplied by the firm Desowag Bayer, Western Germany, or "Decadex firecheck" from the firm Pentagon Plasties, Belgium.

The expression "space-dividing structure" is intended to include walls, partitions and like structures as well as decks and bulkheads to be found on board ship.

In order that the invention can be more clearly understood, convenient embodiments thereof will now be described, by way of example, with reference to the accompanying drawings in which:

FIG. 1 is a front elevation of a pipe bushing according to a first embodiment,

FIG. 2 is a section on the line 2—2 of FIG. 1,

FIG. 3 is a section corresponding to that of FIG. 2 illustrating a pipe bushing of a second embodiment, FIG. 4 illustrates a partial cross-sectional view of a modified pipe bushing having a barrier forming coating thereon;

FIG. 5 illustrates a view similar to FIG. 4 of a pipe bushing having a barrier forming means opposite the flanges of the bushing;

FIG. 6 illustrates a partial cross-sectional view of a pipe bushing having a barrier forming means on the elastically yielding element in accordance with the invention;

FIG. 7 illustrates a view similar to FIG. 6 with a barrier forming means on a steel ring of a pipe bushing according to the invention; and FIG. 8 illustrates a view similar to FIG. 6 of a barrier forming coating on the protective flanges of the pipe bushing according to the invention.

Referring to FIGS. 1 and 2, a wall 10 has an opening 11 for a pipe bushing 12. The pipe bushing 12 is made of a relatively low number of separate parts. A pipe portion-forming component 13 consists of two disc-shaped steel parts 13a, 13b which are fastened together by means of set screws 14, metal-against-metal, along an inner annular joint surface 15 having a groove 16 with inserted O-ring 17. The set screw 14 has its head 14a anchored in a cavity 18 in the one part 13b while its screw threaded portion 14b is received in a screw-threaded, blind-ending bore 19 in the other part 13a.

At 20, there are shown in dotted lines, flange-supporting pipe portions which can be fixed by set screws (not shown) in screw-threaded, blind-ending bores 21 each to its respective side of the pipe bushing, that is to say each to its respective disc-shaped steel part 13a and 13b.

Radially outside the annular joint surface, the parts 13a and 13b are offset so that there is produced an annular groove 22 therebetween for the reception of a radial innermost portion 23a of an elastically yielding, annular, disc-shaped element 23 made of, for example, non-reinforced neoprene rubber. The element 23 is clampled weakly together between the parts 13a, 13b by means of the set screws 14 and the element is passed through by the set screws 14 in the holes belonging thereto. From the groove 22, the element 23 extends radially outwards with an unloaded main portion 23b and outermost is permanently connected with, for example vulcanised to, an inwardly directed groove 24a in a concentrically arranged steel ring 24 which forms the outer fastening means for component of the pipe bushing 12 which component is permanently connected to the wall 10 by means of weld joints 25.

The parts 13a and 13b include protective flanges 26, 27 which are arranged a distance axially outside the element 23 and a corresponding, or somewhat smaller, distance axially outside the steel ring 24 and which project radially outwards approximately to the outer periphery of the latter. During normal use, the pipe portion-forming component 13 is permitted to move to a certain degree, radially and axially, with the dampening in the elastically yielding, annular element 23 and without the parts 26, 27 coming into metallic contact with the steel ring 24.

On the inwardly directed sides of the protective flanges 26, 27, there are received in the associated cavities, barrier-forming means, such as annular disc-shaped fire panels 28, 29 of the "Palusol" type, supplied by the firm BASF, Western Germany. On the appearance of heat, for example, with the start of a fire, the fire panels are activated by the heat and rise up from a thickness of 2 mm to a thickness of 15 mm and, in consequence, fill the whole of the slot 30 which is formed between the protective flanges, the steel ring and the elastic, annular element, as is indicated by the dotted hatching 30a,30b at the bottom of FIG. 2. The material which has risen up consequently forms a new gas-tight sealing between the pipe portion-forming component and the steel ring and independently of the element 23 so that even if the element 23 should be damaged by the development of heat, gas leakage is prevented via the pipe bushing. As a consequence of the passage of heat through the pipe bushing, a double-sided sealing can be obtained as is illustrated.

As mentioned in the introduction, one can employ, instead of the fire panel with associated cavities in the protective flanges, fire-preventing paint or lacquer which can be applied directly on the protective flanges and/or other parts of the pipe bushing e.g. the outer fastening means 24, by spraying, painting or by another suitable application.

It is also possible to obtain a purely mechanical sealing of the slot, for example, by pressing portions of the parts 13a, 13b or portions of the protective flange into abutment with the steel ring by means of the force of a spring which is released after a spring-loaded device is melted as a consequence of the generation of heat.

Within the present protective scope, further additional solutions can be considered which release a barrier-forming device or another barrier creator under the influence of heat without detailed examples of this being described herein.

The objective is to be able to mount the bushing 12 as a coherent unit in the wall 10 by pushing it into position in an opening in the wall and thereafter permanently welding it, via the steel ring 24, to the wall with the weld joints 25. During mounting, the bushing can be secured in an arbitrary manner, for example, via the disc-shaped parts 13a, 13b and, in this connection, it is appropriate to centre the parts 13a, 13b relative to the steel ring 24. In order to achieve this, there are employed centering rings, i.e. O-rings of neoprene, 31a, 31b as shown uppermost in FIG. 2. The rings 31a, 31b can be split in order to simplify the mounting and demounting thereof. During the permanent welding, the rings 31a, 31b serve as protective rings since they prevent weld sparks forcing their way into the slot 30 and destroying or acting on the sealing and dampening element 23 and the fire panels 28, 29 respectively and thus prevent the fire panels being exposed to the influence of heat during the welding operation. After the welding operation is finally completed, the rings 31a, 31b are removed so that vibrations which later are bound to occur in the bushing 12 can be effectively dampened in the element 23 since the parts 13a, 13b can be permitted a certain pivotal movement without coming into contact with the steel ring 24.

In FIG. 3, there is shown another and somewhat more complicated pipe bushing which is based on more separate parts than in the construction according to FIGS. 1 and 2. The pipe portion-forming component 33 according to FIG. 3 comprises a main portion 33a having flange portions 33b and 33c at opposite ends of the main portion 33a. To the middle of the main portion 33a, there is permanently welded a steel ring 34 having an outwardly directed annular groove 35 in which there is secured a radial inner portion 36a of an elastically yielding, annular disc-shaped element 36 of neoprene rubber. A radial outer portion 36b of the element 36 is permanently squeezed in a groove 37 between two clamp rings 38, 39 by means of set screws 40 which squeeze the clamp rings against each other along an intermediate joint surface 15a. At the same time, the clamp ring 39 is permanently squeezed against a steel ring 41 permanently welded to the wall 10 which ring forms the outer fastening component of the pipe bushing. In this case, the clamp rings 38, 39 are each provided with their respective protective flanges 42, 43 having a corresponding design and corresponding function to that which is described with reference to FIGS. 1 and 2.

The barrier forming means may be disposed on various surfaces boarding the slot within a bushing. For example, as shown in FIG. 4, the barrier forming means may be in the form of a coating 44 on the inside surfaces of each flange 26, 27. Alternatively, the barrier forming means may be formed on the outer fastening means 24 either in the form of a panel 28 or a coating 44. Likewise, in a bushing as constructed in FIG. 3, the barrier forming means may be in the form of a panel 28 or coating 44 on the rubber element 36 (FIG. 6), steel ring 34 (FIG. 7) or in the form of a coating 44 on the clamp rings 38, 39 (FIG. 8).

In practice, it is preferred that the clamp rings are designed as separate parts so that after they have been exposed to the influence of heat, they can be readily replaced with new parts with associated heat-activatable barrier creators. However, other designs can also be considered where, for example, the one protective flange with associated barrier creator can be secured to the outer fastening component while the other protective flange with associated barrier creator can be secured to the pipe portion-forming component.

What we claim is:

1. A pipe bushing comprising
    a pair of disc-shaped steel parts fastened together along an inner annular joint surface;
    an elastically yielding annular disc-shaped element clamped between said parts outwardly of said joint surface;
    a steel ring concentric to and secured to said element; said ring being disposed between said steel parts to define a slot between each steel part, said steel ring and said element; and
    barrier-forming means bordering said slot for filling each slot in response to heating of said means.

2. A pipe bushing as set forth in claim 1 wherein said barrier-forming means includes a fire panel capable of rising in response to heat.

3. A pipe bushing as set forth in claim 1 wherein siad barrier-forming means includes a fire panel disposed on each steel part in facing relation to said ring.

4. A pipe bushing as set forth in claim 1 wherein each steel part has a plurality of threaded bores for receiving screws to fix a flanged pipe portion to said part.

5. A pipe bushing as set forth in claim 1 wherein said barrier-forming means is disposed on said element.

6. A pipe bushing as set forth in claim 1 wherein said barrier-forming means is disposed on one of said steel parts.

7. A pipe bushing as set forth in claim 1 wherein said barrier-forming means is disposed on said ring.

8. A pipe bushing comprising
    a pipe-portion component having a main portion and flange portions at opposite ends of said main portion;
    a first steel ring welded to said main portion;
    an elastically yielding annular disc-shaped element secured to said ring;
    a pair of clamp rings disposed against each other along an intermediate joint surface and against opposite sides of a radial outer portion of said element while forming slots between each clamp ring and said element;
    a second steel ring adjacent one of said clamp rings;
    means securing said clamp rings to said second steel ring; and
    barrier-forming means bordering said slot for filling each slot in response to heating of said means.

9. A flexible bushing as set forth in claim 8 wherein said barrier-forming means is disposed on at least one of said clamp rings.

10. A flexible bushing as set forth in claim 8 wherein said barrier-forming means is disposed on said element.

11. A flexible bushing as set forth in claim 8 wherein said barrier-forming means is disposed on said first steel ring.

12. A flexible bushing for supporting a pipe conduit on each side of a space-dividing structure defining an opening for reception of said bushing therein, said bushing comprising a pair of disc-shaped parts fastened together and adapted for mounting said pipe conduits coaxially thereof, each part having an annular flange, outer fastening means secured in gas-tight fashion to said structure at said opening and disposed between said flanges of said parts, an elastically yielding annular element forming a gas-tight connection between said disc-shaped parts and said outer fastening means to define an open slot between said flanges and said annular element, and barrier-forming means bordering said slot which are adapted to be activated by the action of heat to close off said slot in at least a flame protecting manner.

13. A flexible bushing as set forth in claim 12, wherein said barrier-forming means is a disc fixed to at least one of said protective annular flanges.

14. A flexible bushing as set forth in claim 12, wherein said barrier-forming means is a coating applied to at least one of said protective annular flanges.

15. A flexible bushing as set forth in claim 12 wherein said barrier-forming means is a disc fixed to said outer fastening means.

16. A flexible bushing as set forth in claim 12 wherein said barrier-forming means is a coating applied to said outer fastening means.

17. A flexible bushing for supporting a pipe conduit on each side of a space-dividing structure defining an opening for reception of said bushing therein, said bushing comprising a pipe forming component adapted for mounting said pipe conduits coaxially thereof, a ring secured to said component, a pair of clamp rings having annular flanges disposed about said ring, an elastically yielding annular element forming a gas-tight connection between said ring and said clamp rings wherein said flanges define an open slot between said ring and each respective flange, and barrier-forming means bordering said slot which are adapted to be activated by the action of heat to close off said slot in at least a flame protecting manner.

* * * * *